United States Patent
Akutsu (10) Patent No.: US 8,287,039 B2
(45) Date of Patent: Oct. 16, 2012

(54) VEHICLE SEAT WITH A CUSHION ADJUSTMENT MECHANISM

(75) Inventor: Takeshi Akutsu, Shioya-gun (JP)

(73) Assignee: TS Tech Co., Ltd., Saitama-Ken (JP)

( * ) Notice: Subject to any disclaimer, the term of this patent is extended or adjusted under 35 U.S.C. 154(b) by 467 days.

(21) Appl. No.: 12/297,962

(22) PCT Filed: Apr. 21, 2007

(86) PCT No.: PCT/JP2007/058682
§ 371 (c)(1),
(2), (4) Date: Aug. 3, 2009

(87) PCT Pub. No.: WO2007/123219
PCT Pub. Date: Nov. 1, 2007

(65) Prior Publication Data
US 2010/0007183 A1      Jan. 14, 2010

(30) Foreign Application Priority Data

Apr. 21, 2006 (JP) ................................ 2006-118585
Apr. 21, 2006 (JP) ................................ 2006-118586
Apr. 21, 2006 (JP) ................................ 2006-118587

(51) Int. Cl.
*B60N 2/42*    (2006.01)

(52) U.S. Cl. ............... 297/216.12; 297/216.14

(58) Field of Classification Search ............. 297/216.13, 297/216.12, 216.14, 284.4
See application file for complete search history.

(56) References Cited

U.S. PATENT DOCUMENTS

| 4,632,454 A * | 12/1986 | Naert .......................... 297/284.4 |
| 6,871,913 B2 * | 3/2005 | Malsch et al. ................ 297/410 |
| 2004/0119324 A1 * | 6/2004 | Humer et al. ............ 297/216.12 |

FOREIGN PATENT DOCUMENTS

| JP | 10-500596 A | 1/1998 |
| JP | 1999-206506 A1 | 8/1999 |
| JP | 2006-21616 A | 1/2006 |
| WO | 96/31918 A1 | 11/1995 |

* cited by examiner

Primary Examiner — Milton Nelson, Jr.
(74) Attorney, Agent, or Firm — Browdy and Neimark, PLLC (57) ABSTRACT

A vehicle seat includes a cushion plate mounted on seat springs, a seat cushion provided in front of the cushion plate; and an auxiliary plate provided between the seat cushion and the cushion plate for pushing out the seat cushion forward. The auxiliary plate is provided at its upper portion with a plurality of hooks to be engaged in a plurality of engagement holes formed in the cushion plate. The hooks are engaged in the engagement holes so that they can rotate around a lateral direction but do not move in back-and-forth direction and in a vertical direction.

8 Claims, 9 Drawing Sheets

VEHICLE SEAT WITH A CUSHION ADJUSTMENT MECHANISM

TECHNICAL FIELD

The present invention relates to a vehicle seat and particularly to a vehicle seat having a cushion pressure adjusting mechanism.

BACKGROUND ART

A seat back cushion of a conventional vehicle seat is elastically supported on a large number of seat springs mounted between side frames of a seat back frame. The seat springs are zigzag springs or formed wire springs in general.

There is also a known vehicle seat having a cushion plate disposed behind a seat back cushion and supported on a seat back frame by using seat springs (e.g., Patent Document 1).

There is another known vehicle seat having a cushion plate provided with an auxiliary plate that moves back and forth to thereby change cushion pressure (e.g., Patent Document 2).

Patent Document 1: JP 2006-021616A
Patent Document 2: JP 11 (1999)-206506A

DISCLOSURE OF THE INVENTION

A conventional problem was a complex process of mounting the auxiliary plate to the cushion plate, which obstructed cost reduction.

Therefore, it is an object of the present invention to provide a vehicle seat in which it is possible to easily and reasonably mount an auxiliary plate to a cushion plate.

BEST MODE FOR CARRYING OUT THE INVENTION

Figure 1:
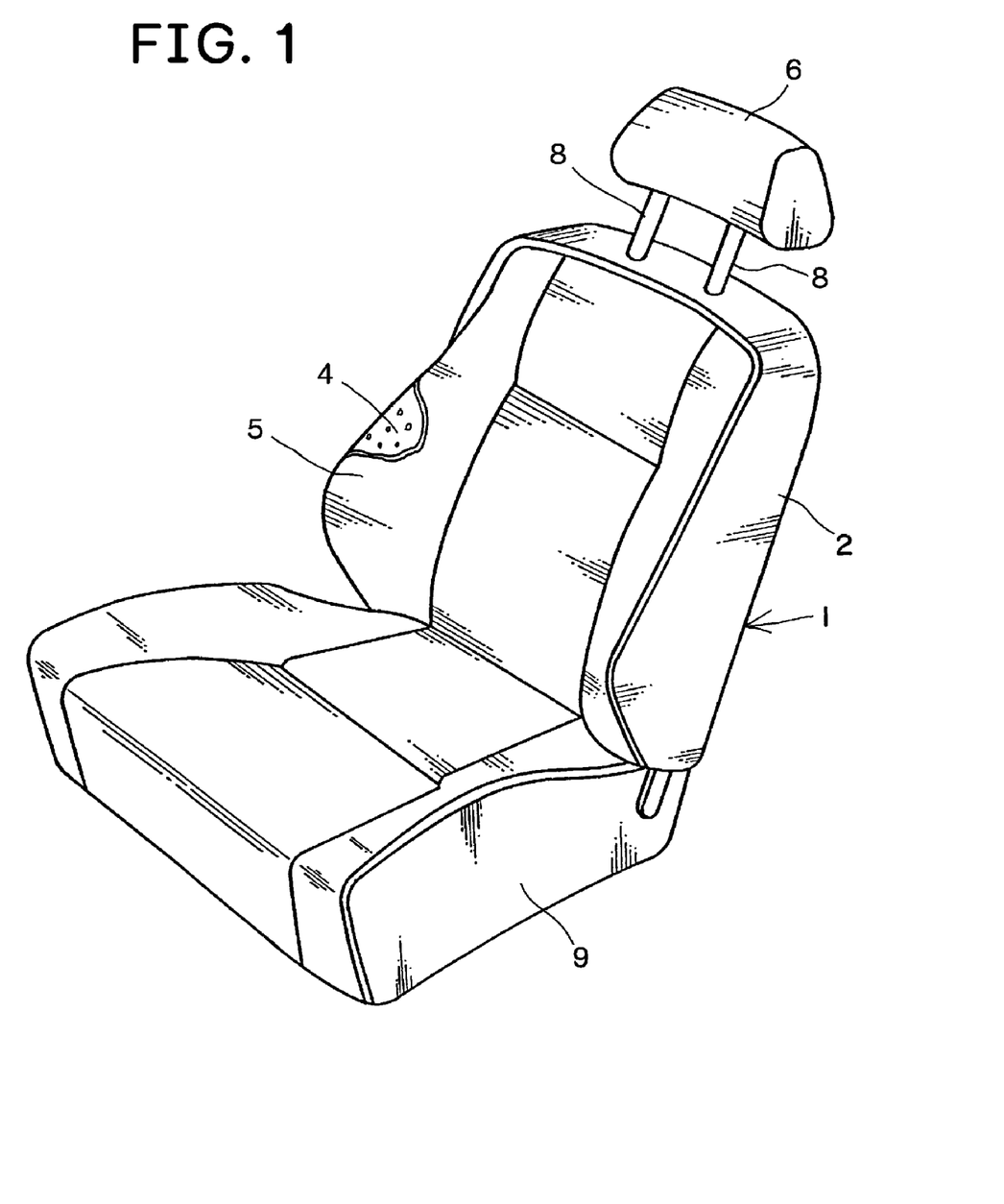
FIG. 1 is a perspective view of a vehicle seat.

An embodiment of the present invention will be described by using the drawings. A vehicle seat 1 of the invention includes a seat back 2, a seat bottom 9, and a headrest 6 provided above the seat back 2. A seat back frame 3 of the seat back 2 has a pair of side frames 17, an upper frame 12, and a lower frame 13 and is in a rectangular frame shape. The vehicle seat 1 has a cushion 4 covered with a skin member 5.

Figure 2:
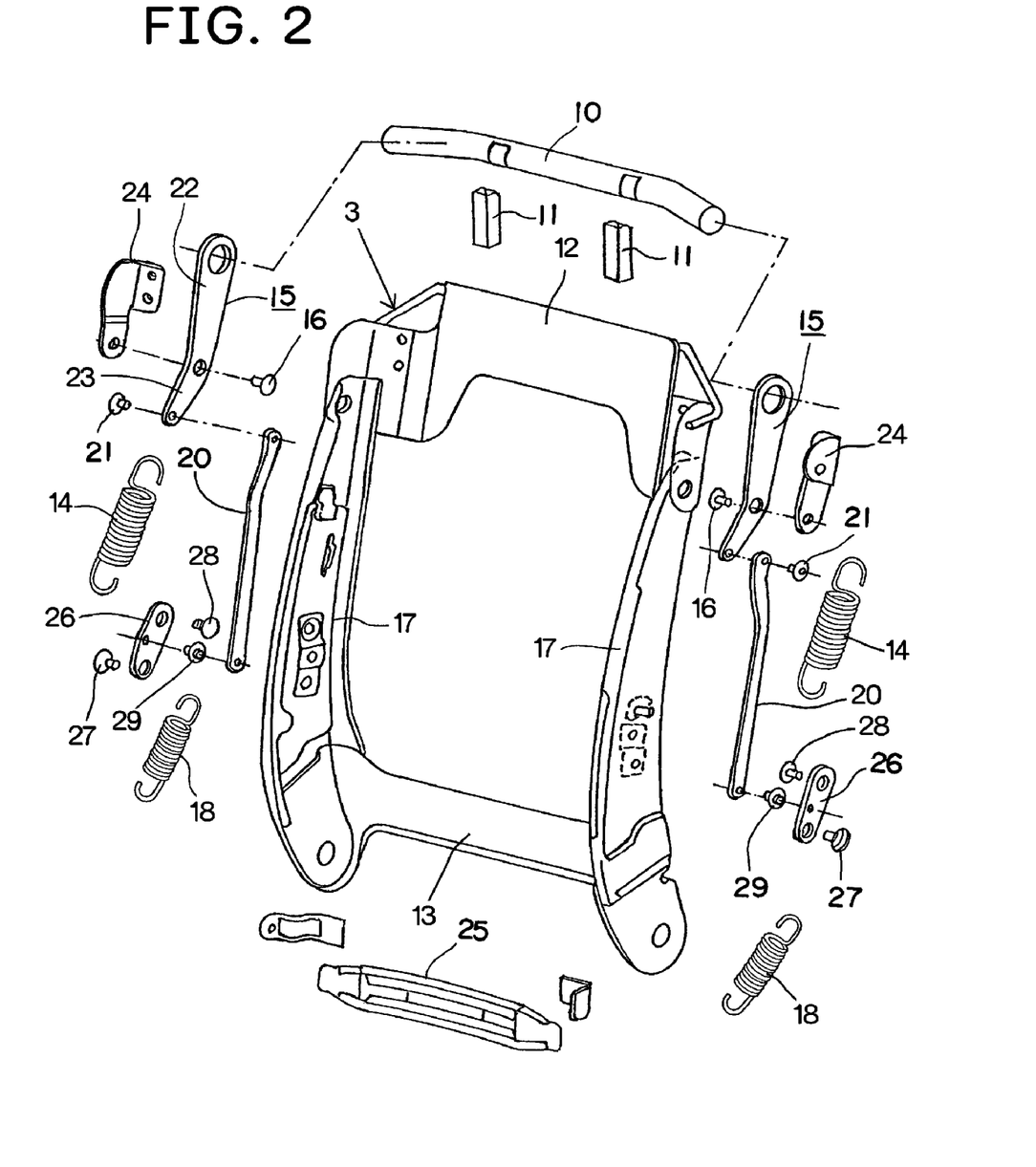
FIG. 2 is an exploded perspective view of a seat back frame of the vehicle seat and basic parts of an active headrest mechanism.
Figure 3:
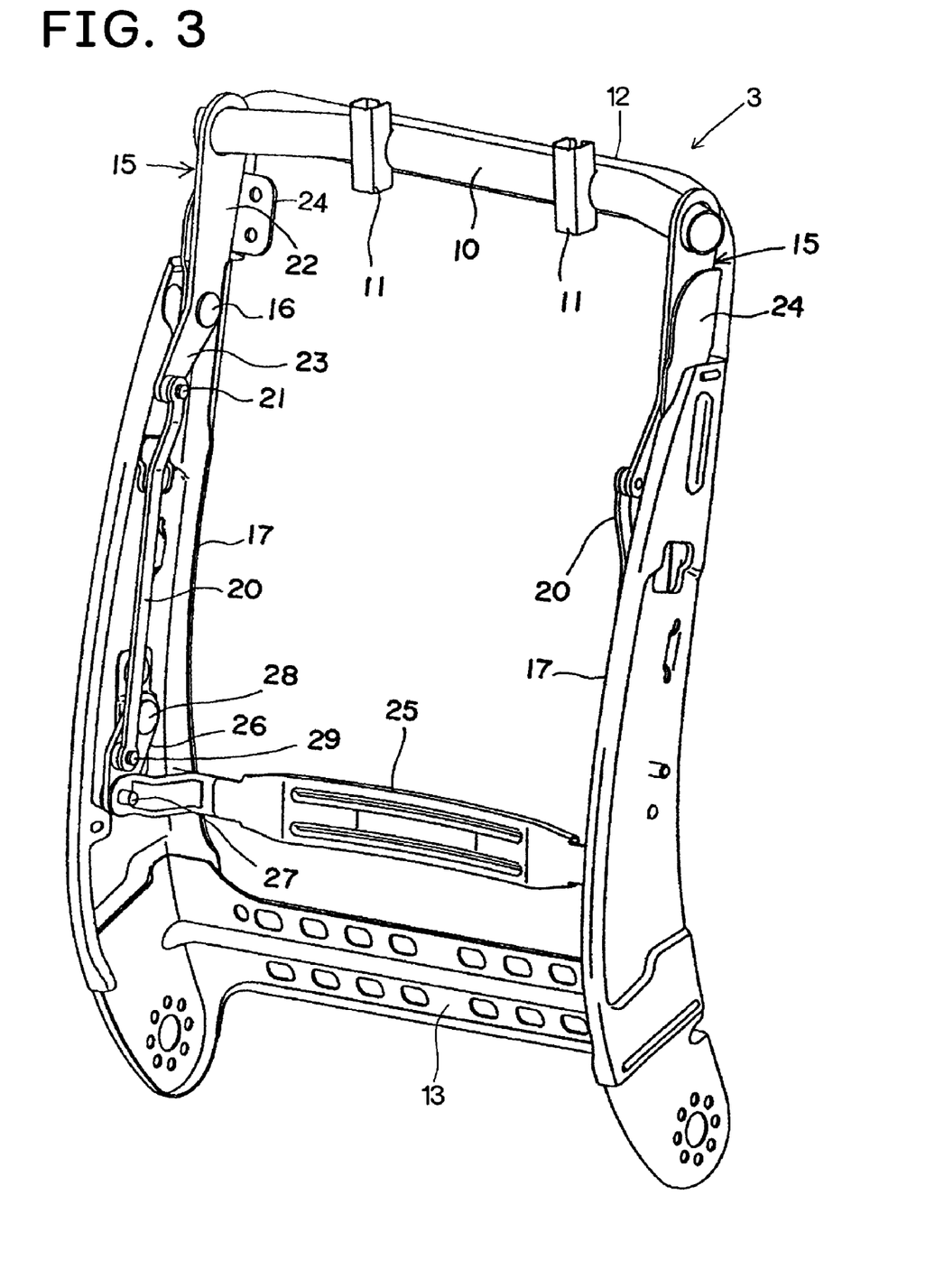
FIG. 3 is a perspective view showing an assembled state of the parts in FIG. 2.

In the vicinity of the upper frame 12, a headrest support portion 10 movable with respect to the seat back frame 3 and extending laterally is disposed. Fixed to the support portion 10 are vertical engagement portions 11 into which lower portions of pillars 8 of the headrest 6 are inserted. The pillars 8 are supported by the vertical engagement portions 11 so that their height is adjustable.

A bracket 24 is provided at each of upper portions of the respective side frames 17 or at each end portion of the upper frame 12. To the bracket 24, an upper link or bell crank 15 is rotatably mounted by a shaft 16. The upper link 15 has an upper long arm 22 extending upward and a lower short arm 23 extending forward and downward. The upper link 15 is biased clockwise in FIG. 5 with resilience of an upper spring 14. The spring 14 has a first end portion coupled to the upper link 15 and a second end portion coupled to the side frame 17. Left and right opposite ends of the headrest support portion 10 are respectively coupled to the upper arms 22, 22. The lower arm 23 is pivoted on an upper portion of a vertically long coupling rod 20 by a pin 21.

Figure 5:
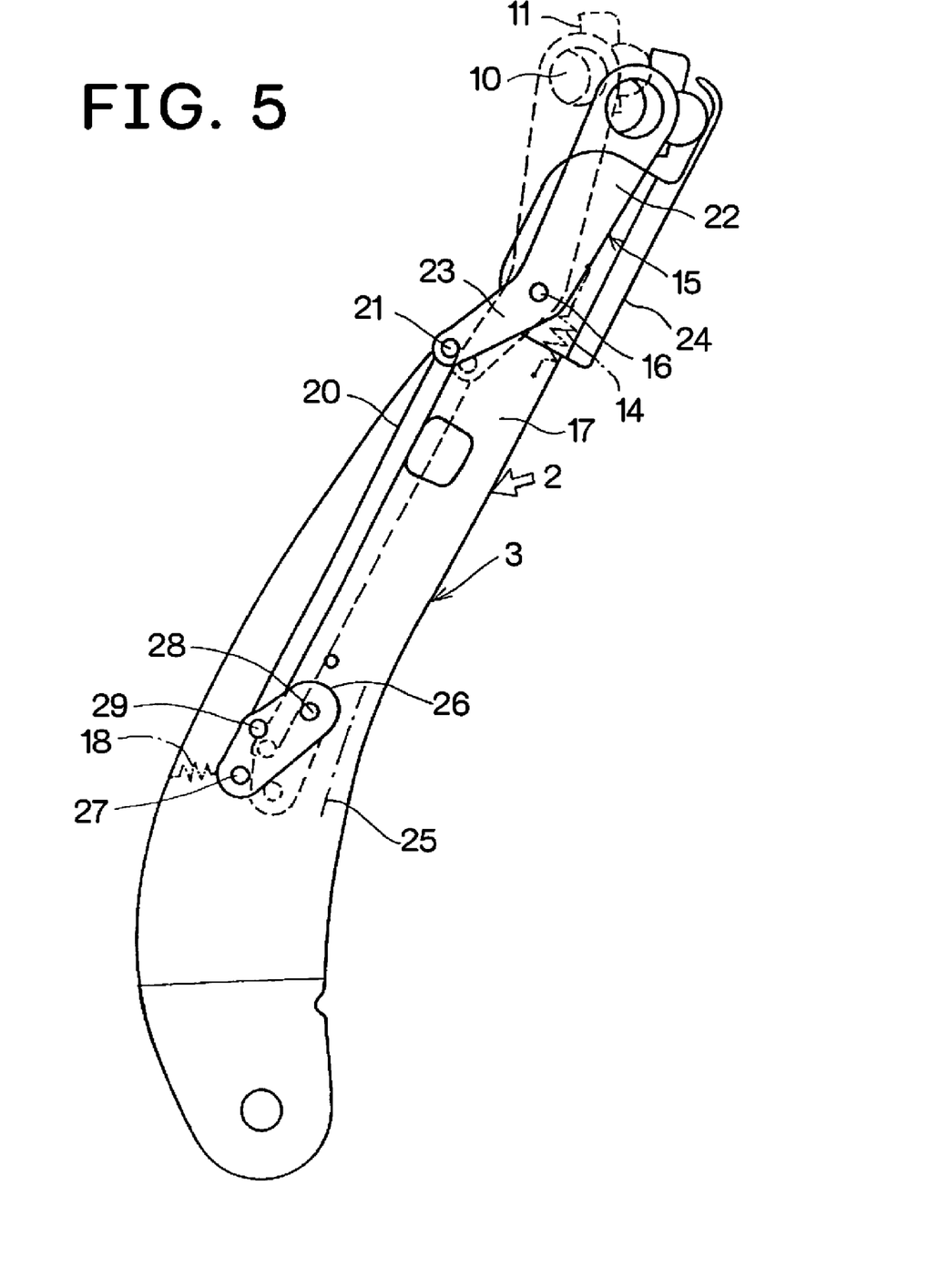
FIG. 5 is a side view of a side frame of the seat back frame and basic parts of the active headrest mechanism.

The upper link 15 is normally retained in a position shown in a solid line in FIG. 5 with the resilience of the spring 14 or the like and, as a result, the headrest 6 is also retained in a normal position. However, if the upper link 15 rotates counterclockwise toward a position shown in a dotted line, the headrest support portion 10 moves forward and the headrest 6 is pushed out forward.

Disposed between the side frames 17, 17 is a vehicle rear-end collision detecting body 25 extending laterally. The collision detecting body 25 moves rearward when the vehicle seat 1 moves forward with respect to a seated person due to rear-end collision and the person is pushed against the body 25. Opposite ends of the detecting body 25 are respectively coupled to lower links 26, 26 by pins 27, 27 and the lower links 26, 26 are pivoted on the side frames 17, 17 by shafts 28, 28. To each of the lower links 26, 26, a lower portion of the coupling rod 20 is coupled by a pin 29. As shown in FIG. 5, one end of the lower spring 18 is coupled to the lower link 26, the other end is coupled to the side frame 17, and the lower link 26 is biased clockwise. In this way, the collision detecting body 25 is retained in a front normal position.

If the rear-end collision occurs, the collision detecting body 25 is pushed by the seated person, moves rearward, rotates the lower links 26 counterclockwise, and moves the coupling rods 20 down in FIG. 5. As this time, because a distance between the pin 29 and the shaft 28 is shorter than a distance between the pin 27 and the shaft 28, the rearward movement of the collision detecting body 25 is effectively transmitted to the coupling rod 20. The downward movement of the rod 20 rotates the upper link 15 counterclockwise and, as a result, the headrest support portion 10 moves forward. At this time, because the upper arm 22 of the upper link 15 is longer than the lower arm 23, the downward movement of the coupling rod 20 effectively moves the headrest support portion 10 forward. As a result of the forward movement of the support portion 10, the headrest 6 is pushed out forward to protect a head portion (neck) of the seated person at the time of the rear-end collision.

The side frames 17 are formed of metal plates having predetermined width in a front-and-rear direction. A transmitting mechanism for transmitting the rearward movement of the collision detecting body 25 to the headrest support portion 10 is disposed near the side frames 17. Therefore, the cushion 4 of the seat back 2 does not interfere with movement of the transmitting mechanism. The mechanism from the collision detecting body 25 to the headrest support portion 10 is an active headrest mechanism.

Figure 4:
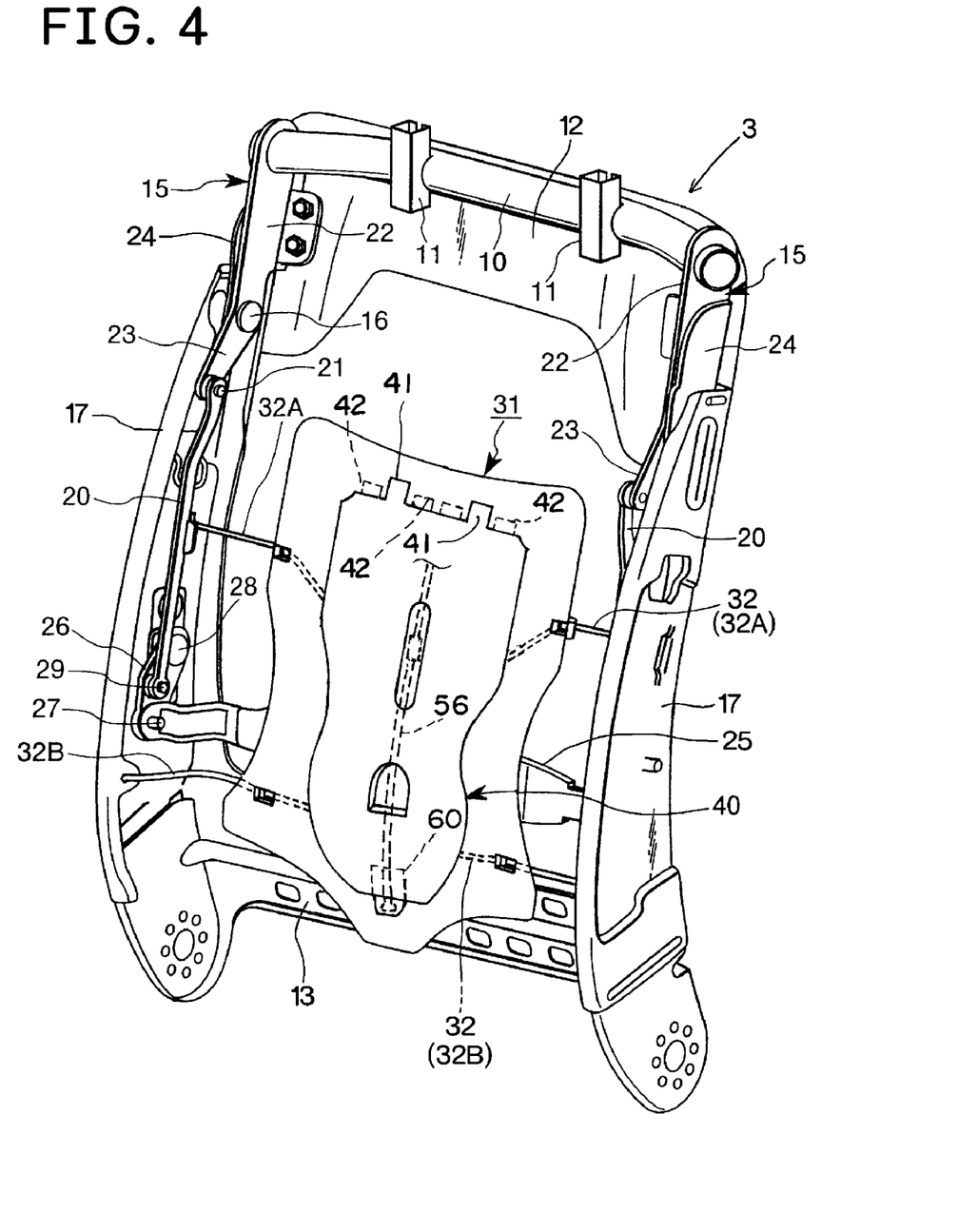
FIG. 4 is a perspective view showing a state in which a cushion plate and an auxiliary plate are mounted on the assembly in FIG. 3.
Figure 6:
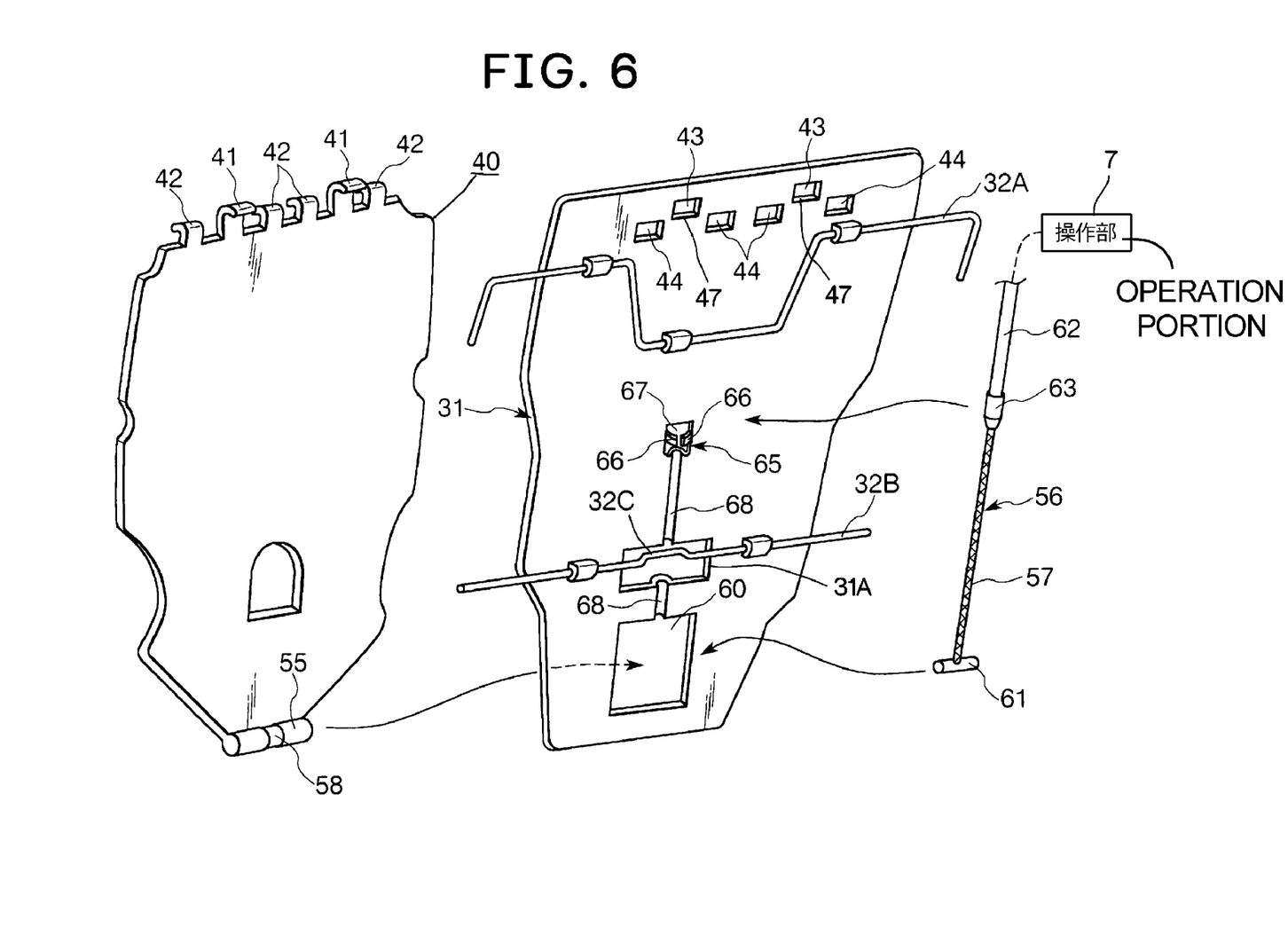
FIG. 6 is a perspective view of the cushion plate, the auxiliary plate, and a wire cable.

Inside the back frame 3, a flexible cushion plate 31 is disposed as shown in FIG. 4. The plate 31 is preferably made of synthetic resin such as polypropylene and substantially in a single rectangular plate shape. A back face of the plate 31 is supported by seat springs 32 such as zigzag springs and formed wire springs. The seat springs 32 include at least an upper seat spring 32A and a lower seat spring 32B. A bent portion 32C formed at a central portion of the lower seat spring 32B is positioned to be able to be engaged in an opening 31A formed in the cushion plate 31 as clearly shown in FIG. 6. The respective springs 32 extend substantially laterally and their opposite ends are coupled to the side frames 17, 17 of the seat back frame 3. The cushion plate 31 is provided behind the seat back cushion 4.

The cushion plate 31 bends under a load of the seated person and moves rearward against resilience of the springs 32 to thereby flexibly support the seated person. Since the plate 31 supports the cushion 4 with its "face", it can provide greater stability and comfort to the seated person as compared with the prior-art structure where the cushion 4 is supported by the springs 32 only.

The collision detecting body 25 is disposed behind the cushion plate 31 with a predetermined interval therebetween. Since the cushion plate 31 is in a plate shape that widely covers a back of the seated person, it receives the load of the seated person with large part of it and moves rearward at the time of rear-end collision. An amount of rearward movement of the cushion plate 31 is the greatest between its vertical middle portion and its portion slightly below the middle portion. Therefore, the collision detecting body 25 is preferably disposed in a vertical middle position or a position slightly below the middle position of the cushion plate 31 so that it can reliably receive the rearward movement of the cushion plate 31.

With the above-described combination of the cushion plate 31 and the collision detecting body 25, a comfortable sitting feeling, a feeling of being held, and reliable detection of rear-end collision can be expected.

Figure 7:
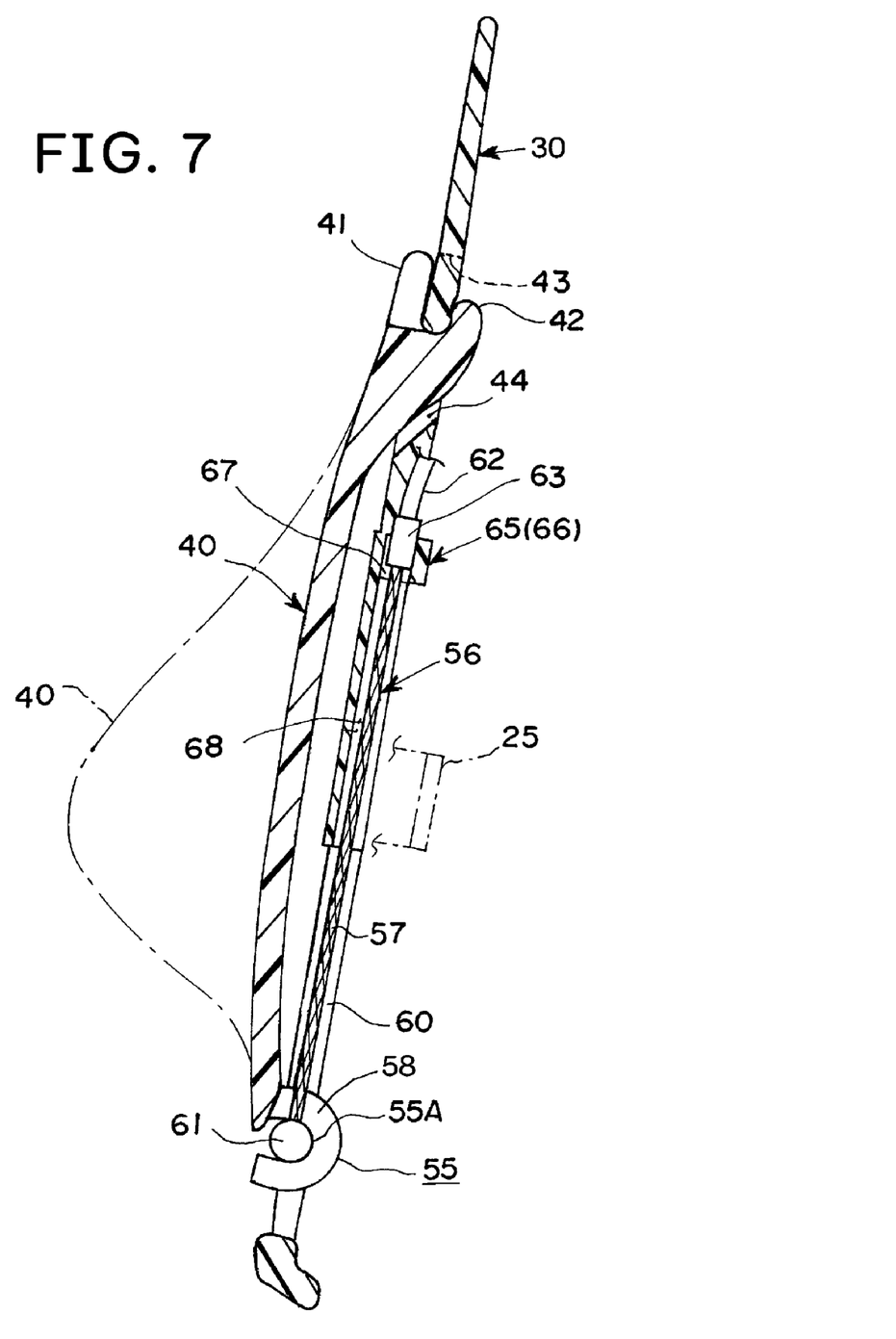
FIG. 7 is a sectional view of an assembled state of the parts in FIG. 6.
Figure 8:
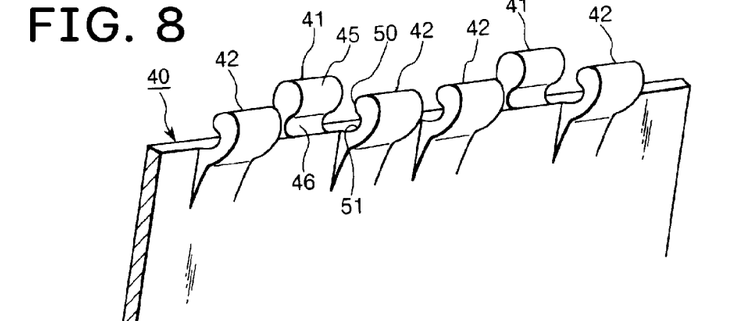
FIG. 8 is a perspective view of an upper portion of the auxiliary plate.

Between the seat cushion 4 and the cushion plate 31, a flexible auxiliary plate 40 is provided. The auxiliary plate 40 is preferably made of synthetic resin such as polypropylene and is in a single rectangular plate shape smaller than the cushion plate 31. The auxiliary plate 40 is mounted on the cushion plate 31 and curves forward according to operation by the seated person as shown in FIG. 7. As the auxiliary plate curves, the cushion 4 is pushed out forward and cushion pressure applied to the seated person is adjusted.

At an upper portion of the auxiliary plate 40, a plurality of rear-facing hooks 41 and a plurality of front-facing hooks 42 are formed integrally. The rear-facing hooks are engaged in upper engagement holes 43 formed in the cushion plate 31 and the front-facing hooks 42 are engaged in lower engagement holes 44 formed in the cushion plate 31. As is clearly shown in FIG. 9, each of the rear-facing hooks 41 has a rear inclined cam face 45 and a rear arcuate engagement face 46 extending from the cam face 45 and each of the front-facing hooks 42 has a front inclined cam face 50 and a front arcuate engagement face 51 extending from the cam face 50.

Figures 9, 10:
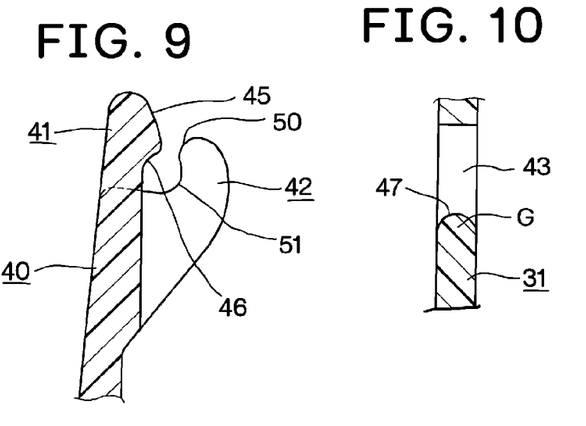
FIG. 9 is a sectional view of the upper portion of the auxiliary plate.
FIG. 10 is a partial sectional view of the cushion plate.
Figure 11:
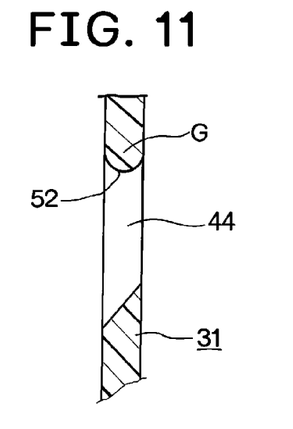
FIG. 11 is a partial sectional view of the cushion plate.
Figure 12:
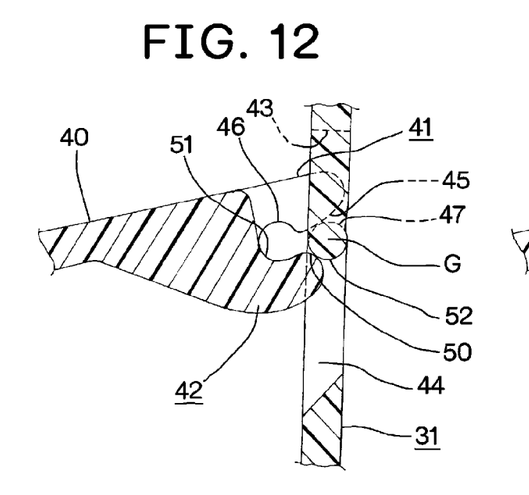
FIG. 12 is a sectional view showing a state immediately before the upper portion of the auxiliary plate is coupled to the cushion plate.

A lower edge of the upper engagement hole 43 is formed into an upward bulging arcuate edge 47 as shown in FIG. 10 and the arcuate engagement face 46 of the rear-facing hook 41 is fitted with the arcuate edge 47. An upper edge of the lower engagement hole 44 is formed into a downward bulging arcuate edge 52 as shown in FIG. 11 and the arcuate engagement face 51 of the front-facing hook 42 is fitted with the arcuate edge 52. Axial centers of the arcuate edges 47 of the upper engagement holes 43 and axial centers of the arcuate edges 52 of the lower engagement holes 44 are aligned with each other on a center line G. In this way, the arcuate edges 47 and the arcuate edges 52 apparently form a single round bar as shown in FIG. 12. A diameter of the round bar is equal to or slightly shorter than a distance between the arcuate engagement face 46 and the arcuate engagement face 51.

Figure 13:
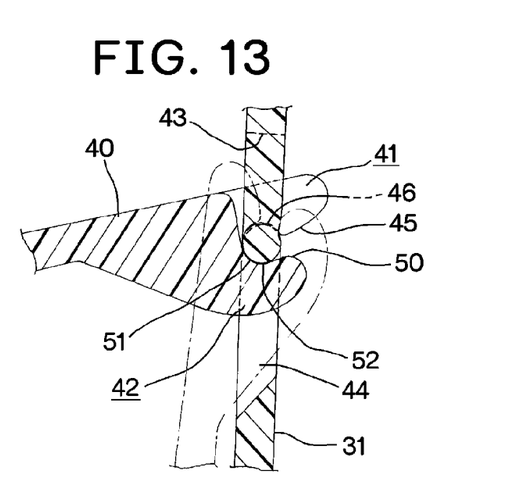
FIG. 13 is a sectional view showing a state in which the upper portion of the auxiliary plate is coupled to the cushion plate.

As shown in FIG. 12, if the auxiliary plate 40 is made substantially horizontal and moved rearward to insert the rear-facing hooks 41 and the front-facing hooks 42 into the upper engagement holes 43 and the lower engagement holes 44 in the cushion plate 31, respectively, the inclined cam faces 45 of the rear-facing hooks 41 come in contact with the arcuate edges 47 of the upper engagement holes 43 and the inclined cam faces 50 of the front-facing hooks 42 come in contact with the arcuate edges 52 of the lower engagement holes 44. Clearances between the rear-facing hooks 41 and the front-facing hooks 42 are elastically widened and then the arcuate engagement faces 46 of the rear-facing hooks 41 and the arcuate engagement faces 51 of the front-facing hooks 42 are closely fitted with the arcuate edges 47 and the arcuate edges 52, respectively, as shown in FIG. 13. Then, if the auxiliary plate 40 is rotated so that it becomes parallel to the cushion plate 31, mounting of the upper portion of the auxiliary plate 40 and the cushion plate 31 to each other is completed.

Figures 14, 15, 16, 17, 18:
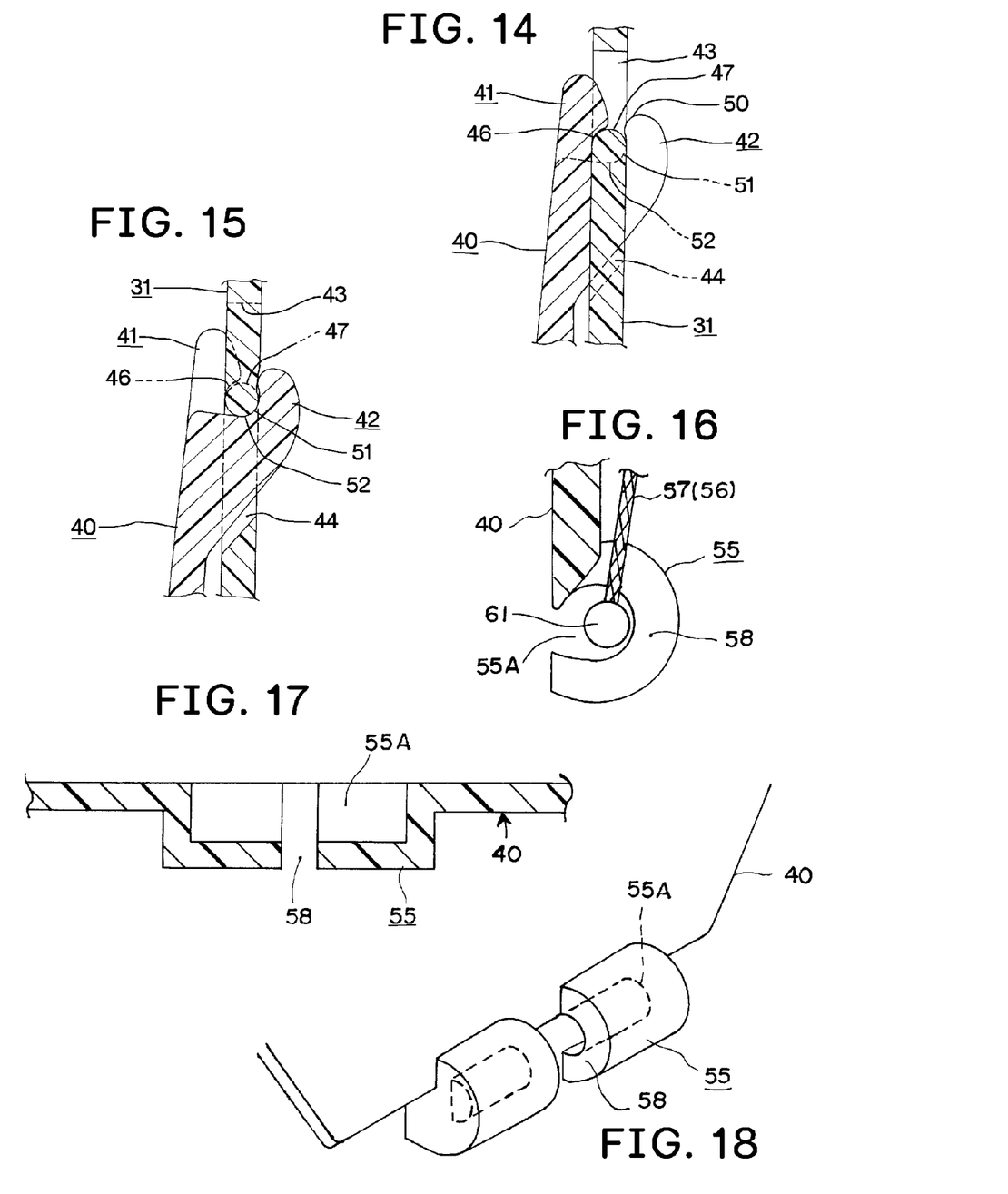
FIG. 14 is a sectional view showing a relationship between a rear-facing hook and an upper engagement hole when the auxiliary plate is made parallel to the cushion plate.
FIG. 15 is a sectional view showing a relationship between a front-facing hook and a lower engagement hole when the auxiliary plate is made parallel to the cushion plate.
FIG. 16 is a sectional view of a lower engagement portion of the auxiliary plate and the wire cable.
FIG. 17 is a sectional view of the lower engagement portion of the auxiliary plate.
FIG. 18 is a perspective view of the lower engagement portion of the auxiliary plate.

A rearward protruding lower engagement portion 55 is formed at a lower portion of the auxiliary plate 40. A cable head 61 of an inner cable 57 of a wire cable 56 is locked to the lower engagement portion 55. The wire cable 56 is coupled to an operation portion 7 provided to the vehicle seat 1. The lower engagement portion 55 has a housing recessed portion 55A for housing the cable head 61 and a slit 58 through which the inner cable 57 can pass.

In a lower portion of the cushion plate 31, a lower guide slot 60 in which the lower engagement portion 55 is slidably engaged is formed. If the cable head 61 moves up and down according to operation by the seated person, the lower engagement portion 55 smoothly moves up and down without wobbling while guided by the slot 60. Therefore, a width of the lower engagement portion 55 and a width of the slot 60 are set properly so that the wobbling does not occur.

The cushion plate 31 is provided with a tube retaining portion 65 for retaining a tip end 63 of an outer tube 62 of the wire cable 56. The tube retaining portion 65 is preferably formed of a recessed portion 67 and a pair of retaining arms 66 formed at the cushion plate 31. A groove passage 68 in which the inner cable 57 is disposed is formed on a back face of the cushion plate 31 and between the tube retaining portion 65 and the lower guide slot 60.

(Function)

As shown in FIG. 12, if the auxiliary plate 40 is made substantially horizontal and moved backward to insert the rear-facing hooks 41 and the front-facing hooks 42 into the upper engagement holes 43 and the lower engagement holes 44 in the cushion plate 31, respectively, the inclined cam faces 45 of the rear-facing hooks 41 come in contact with the arcuate edges 47 of the upper engagement holes 43 and the inclined cam faces 50 of the front-facing hooks 42 come in contact with the arcuate edges 52 of the lower engagement holes 44. The clearances between the rear-facing hooks 41 and the front-facing hooks 42 are elastically widened and then the arcuate engagement faces 46 of the rear-facing hooks 41 and the arcuate engagement faces 51 of the front-facing hooks 42 are closely fitted with the arcuate edges 47 and the arcuate edges 52, respectively, as shown in FIG. 13.

Then, if the auxiliary plate 40 is rotated so that it becomes parallel to the cushion plate 31, mounting of the upper portion of the auxiliary plate 40 and the cushion plate 31 is completed. At this time, the axial centers of the arcuate edges 47 and the axial centers of the arcuate edges 52 of the lower engagement holes 44 are aligned with each other on the center line G and therefore, the arcuate edges 47 and the arcuate edges 52 apparently form the single round bar as shown in FIG. 12. As a result, the auxiliary plate 40 can smoothly rotate around the round bar.

Moreover, since the arcuate engagement faces 46 and the arcuate engagement faces 51 come in contact with the arcuate edges 47 and the arcuate edges 52 from opposite sides, the upper portion of the auxiliary plate 40 is coupled to the cushion plate 31 with sufficient connection strength without impairing smooth rotation of the auxiliary plate 40. By using the hooks 41, 42 and the engagement holes 43, 44, it is possible to extremely easily mount the upper portion of the auxiliary plate 40 on the cushion plate 31.

When the upper portion of the auxiliary plate 40 is mounted on the cushion plate 31, the cable head 61 of the wire cable 56 is engaged with the lower engagement portion 55 of the auxiliary plate 40. The inner cable 57 of the wire cable 56 extending upward through the slit 58 of the lower engagement portion 55 is disposed in the groove passage 68 formed on the back face of the cushion plate 31 and the tip end 63 of the outer tube 62 is engaged with the tube retaining portion 65. At this time, because the inner cable 57 is disposed in the groove passage 68 on the back face of the cushion plate 31, the lower engagement portion 55 with which the cable head 61 is engaged stays in the lower guide slot 60 of the cushion plate 31 and forward detachment of the lower engagement portion 55 from the lower guide slot 60 is reasonably prevented.

Then, if the seated person operates the operation portion 7 to move up the cable head 61, the lower engagement portion 55 smoothly moves up without wobbling while guided by the slot 60.

In the above-described structure, since independent shafts, pins, screws, and the like need not be used to couple the auxiliary plate 40 to the cushion plate 31 and the wire cable 56, it is possible to reduce cost. Moreover, the tube retaining portion 65 for retaining the tip end 63 of the outer tube 62 is formed at the cushion plate 31 in which, therefore, the tube tip end 63 can be directly embedded and the inner cable 57 can be also housed in the groove passage 68 in the cushion plate 31. In this way, the cushion plate 31 and the wire cable 56 require smaller thickness. Since the inner cable 57 housed in the groove passage 68 does not substantially interfere with the collision detecting body 25, the wire cable 56 does not affect performance of the active headrest mechanism.

The auxiliary plate 40 is normally kept parallel to the cushion plate 31 so that the auxiliary plate 40 does not apply forward pressure to the cushion 4. In this state, the lower engagement portion 55 of the auxiliary plate 40 is positioned in the lowermost part of the lower guide slot 60. If the operation portion 7 is operated to move up the cable head 61, the lower engagement portion 55 smoothly moves up without wobbling while guided by the slot 60. As a result, the auxiliary plate 40 protrudes forward to move the cushion 4 forward as shown in FIG. 7. By curving the auxiliary plate 40 by the operation portion 7 in this manner, it is possible to provide a seat shape similar to that desired by the seated person.

The performance of the active headrest mechanism may be affected by mounting of the auxiliary plate on the cushion plate in the prior art. In the structure in the present application, however, the cushion plate 31 is mounted on the side frames 17, 17 by the seat springs 32. Therefore, the cushion plate 31 moves independently of the collision detecting body 25 even if the cushion pressure is changed by the auxiliary plate 40. As a result, mounting of the auxiliary plate 40 on the cushion plate 31 does not affect the performance of the active headrest mechanism.

The invention claimed is:

1. A vehicle seat comprising:
a rectangular-frame-shaped seat back frame including a pair of side frames;
upper and lower seat springs mounted between the side frames;
a single plate-shaped flexible cushion plate mounted on the seat springs;
a seat back cushion provided in front of the cushion plate; and
a single plate-shaped flexible auxiliary plate provided between the seat back cushion and the cushion plate and mounted on the cushion plate,
wherein the auxiliary plate pushes out the seat back cushion forward when it protrudes forward while curving,
wherein the auxiliary plate is provided at its upper portion with a plurality of hooks to be engaged in a plurality of engagement holes formed in the cushion plate, and the hooks are engaged in the engagement holes so that they can rotate around a lateral direction but do not move in a back-and-forth direction and in a vertical direction.

2. The vehicle seat according to claim 1, wherein the hooks include a rear-facing hook protruding rearward and a front-facing hook protruding forward, the rear-facing hook is engaged in a corresponding one of upper engagement holes of the plurality of engagement holes formed in the cushion plate, and the front-facing hook is engaged in a corresponding one of lower engagement holes of the plurality of engagement holes formed in the cushion plate.

3. The vehicle seat according to claim 2, wherein the upper engagement holes are formed at their lower edge with an upward arcuate edge, the lower engagement holes are formed at their upper edge with a downward arcuate edge, the rear-facing hook is formed with a rear arcuate engagement face to be fitted with the upward arcuate edge, and the front-facing hook is formed with a front arcuate engagement face to be fitted with the downward arcuate edge.

4. The vehicle seat according to claim 3, wherein a center of an arc of the upward arcuate edge is aligned with a center of an arc of the downward arcuate edge.

5. The vehicle seat according to claim 1, wherein the auxiliary plate is provided at its lower portion with a lower engagement portion, the cushion plate is formed with a lower guide slot in which the lower engagement portion is engaged for vertical sliding, and a cable head of a wire cable coupled to an operation portion is engaged with the lower engagement portion.

6. The vehicle seat according to claim 5, wherein the cushion plate is provided on its back face with a groove passage in which an inner cable of the wire cable is disposed.

7. The vehicle seat according to claim 6, wherein the cushion plate is provided on its back face with a tube retaining portion for retaining a tip end of an outer tube of the wire cable.

8. A vehicle seat comprising:
a rectangular-frame-shaped seat back frame including a pair of side frames;
upper and lower seat springs mounted between the side frames;
a single plate-shaped flexible cushion plate mounted on the seat springs;
a seat back cushion provided in front of the cushion plate;
a single plate-shaped flexible auxiliary plate provided between the seat back cushion and the cushion plate and mounted on the cushion plate;
a headrest; and
a collision detecting body for moving the headrest forward when it moves rearward,
wherein the auxiliary plate pushes out the seat back cushion forward when it protrudes forward while curving,
wherein the auxiliary plate is provided at its upper portion with a plurality of hooks to be engaged in a plurality of engagement holes formed in the cushion plate, the hooks are engaged in the engagement holes so that they can rotate around a lateral direction but do not move in a back-and-forth direction and in a vertical direction,
wherein the auxiliary plate is provided at its lower portion with a lower engagement portion,
wherein the cushion plate is formed with a lower guide slot in which the lower engagement portion is engaged for vertical sliding,
wherein a cable head of a wire cable coupled to an operation portion is engaged with the lower engagement portion,
wherein the cushion plate is provided on its back face with a groove passage in which an inner cable of the wire cable is disposed, and
wherein the collision detecting body is disposed behind the cushion plate and in such a vertical position as to face the inner cable.

* * * * *